United States Patent
Herrero (10) Patent No.: US 9,762,412 B2
(45) Date of Patent: Sep. 12, 2017

(54) REDUNDANT TRAFFIC ENCODING OF ENCAPSULATED REAL TIME COMMUNICATIONS

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 183 days.

(21) Appl. No.: 14/831,182

(22) Filed: Aug. 20, 2015

(65) Prior Publication Data

US 2017/0054573 A1 Feb. 23, 2017

(51) Int. Cl.
*G06F 15/16* (2006.01)
*H04L 12/46* (2006.01)
*H04L 29/06* (2006.01)
*H04L 29/08* (2006.01)

(52) U.S. Cl.
CPC ........ *H04L 12/4633* (2013.01); *H04L 65/608* (2013.01); *H04L 67/1023* (2013.01)

(58) Field of Classification Search
CPC ....................... H04L 12/4633; H04L 67/1012; H04L 65/608
See application file for complete search history.

(56) References Cited

U.S. PATENT DOCUMENTS

| 9,231,976 | B2 * | 1/2016 | Buruganahalli | |
|---|---|---|---|---|
| 2013/0283037 | A1 * | 10/2013 | Katz | H04L 63/04 713/151 |
| 2014/0282843 | A1 * | 9/2014 | Buruganahalli | H04L 63/0428 726/1 |

OTHER PUBLICATIONS

H. Schulzrinne et al.; "RTP: A Transport Protocol for Real-Time Applications";Jul. 2003; 89 pages.
3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

*Primary Examiner* — Richard G Keehn
(74) *Attorney, Agent, or Firm* — Miles & Stockbridge P.C.

(57) ABSTRACT

A system that performs redundant encoding for real-time communications ("RTC") establishes a tunnel by a tunneling server with a tunneling client of user equipment ("UE"). The system receives a request from the UE to enable the redundant encoding for an inner socket of the tunnel and sends a response back to the UE to indicate that the redundant encoding is enabled for the inner socket, where the response includes a buffer size. For each first frame received on the inner socket, the system stores the first frame in a buffer of the buffer size. The system further receives a reference that corresponds to a second frame from the UE on the inner socket and retrieves the second frame that corresponds to the first reference from the buffer.

20 Claims, 5 Drawing Sheets

REDUNDANT TRAFFIC ENCODING OF ENCAPSULATED REAL TIME COMMUNICATIONS

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that performs redundant encoding for real-time communications ("RTC"). The system establishes a tunnel by a tunneling server with a tunneling client of user equipment ("UE"). The system receives a request from the UE to enable the redundant encoding for an inner socket of the tunnel and sends a response back to the UE to indicate that the redundant encoding is enabled for the inner socket, where the response includes a buffer size. For each first frame received on the inner socket, the system stores the first frame in a buffer of the buffer size. The system further receives a reference that corresponds to a second frame from the UE on the inner socket and retrieves the second frame that corresponds to the first reference from the buffer.

DETAILED DESCRIPTION

One embodiment is a system that, before transmitting encapsulated media, or frames, over a tunnel, determines if the same or redundant frame has previously been sent. If so, the system sends an identity of the previously sent frame, rather than sending the frame again, in order to reduce bandwidth.

In general, encapsulated frames, sent sequentially inside a tunnel, constitute streams that typically include a large amount of redundant information. This redundancy is typically the result of traffic patterns repeating periodically, especially when real time communications media frames are involved. For example, during a telephone call, speech patterns are frequently repeated. Therefore, in order to reduce bandwidth of tunnel traffic, embodiments implement redundant traffic encoding ("RTE"). Embodiments compare traffic being transmitted against traffic previously sent so that if a match is found, rather than sending the whole sequence (i.e., one or more frames), a reference is instead sent. As a consequence, the transmission rate is substantially reduced since in one embodiment, long frames (e.g., 160 bytes) are instead encapsulated as substantially smaller 32-bit reference sequence numbers.

Figure 1:
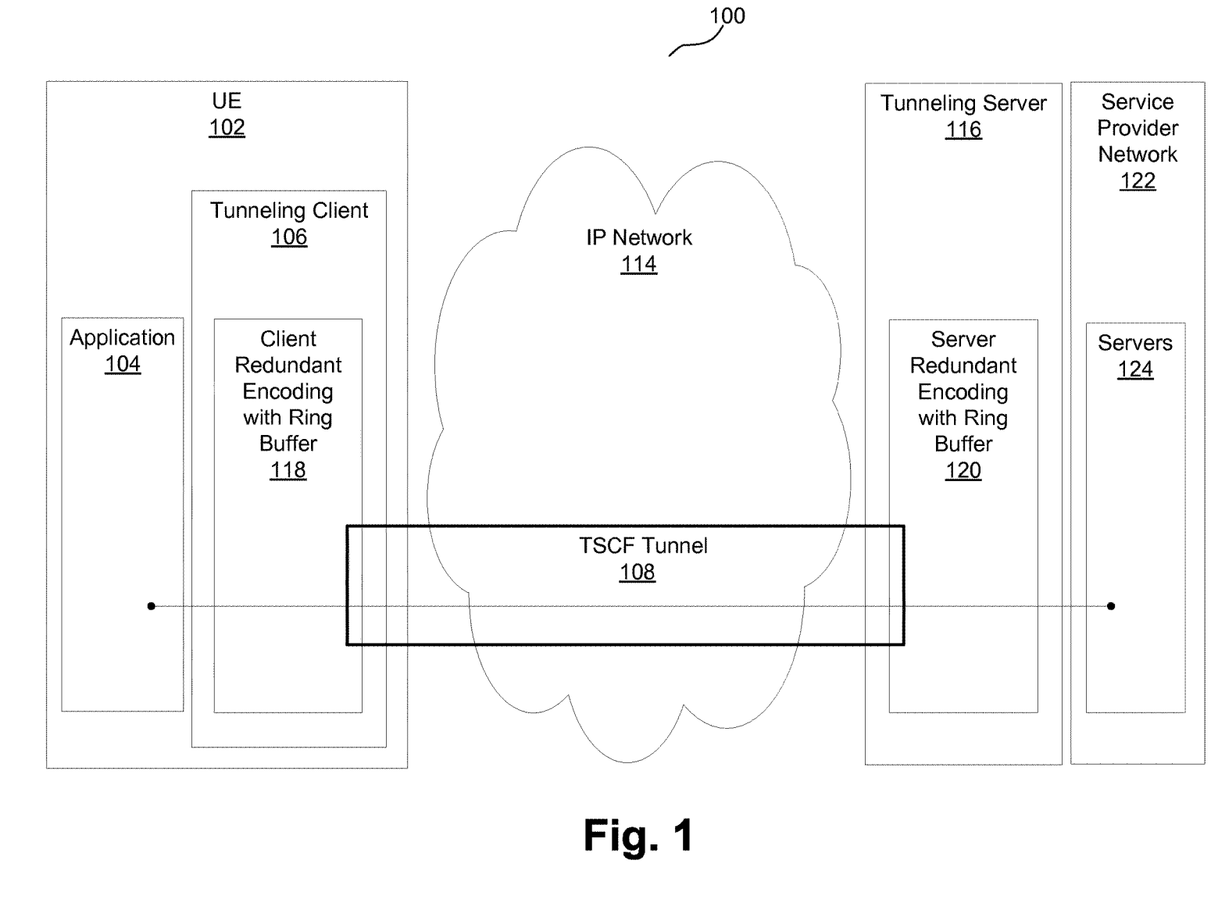
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client redundant encoding module 118 and/or a server redundant encoding module 120. In general, for the functionality of tunnel 108, client redundant encoding module 118 and/or server redundant encoding module 120 check for redundant frames and substitute smaller sequence numbers for the redundant frames in order to reduce bandwidth requirements. The SDK in general provides additional APIs beyond "standard" TSCF APIs in order to implement the functionality disclosed herein.

Figure 2:
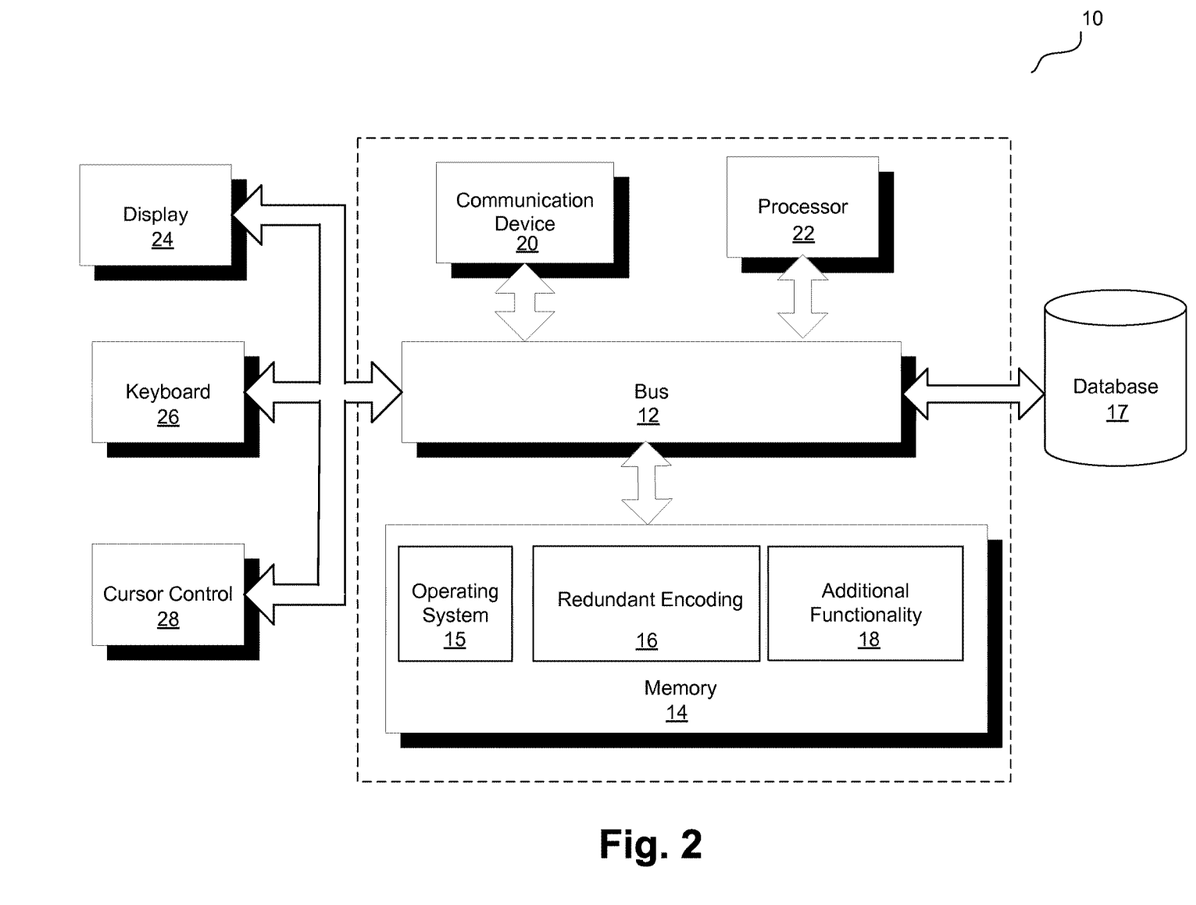
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a redundant encoding module 16 for providing redundant encoding/decoding for redundant frames, and all other functionality disclosed herein. In one example embodiment, redundant encoding module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for redundant encoding module 16 and additional functional modules 18.

In one embodiment, redundant encoding module 16 and/or additional functional modules 18 may include several modules to provide the redundant encoding functionality. The modules in one embodiment include a tunneling module that establishes a tunnel with a tunneling client of a user equipment and a redundant frame module for detecting redundant frames and transmitting reference sequence numbers instead of the redundant frames.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated (i.e., in a packet/frame) media is typically communicated according to the real-time transport protocol ("RTP" as provided, for example, in IETF RFC 3550).

Figure 3:
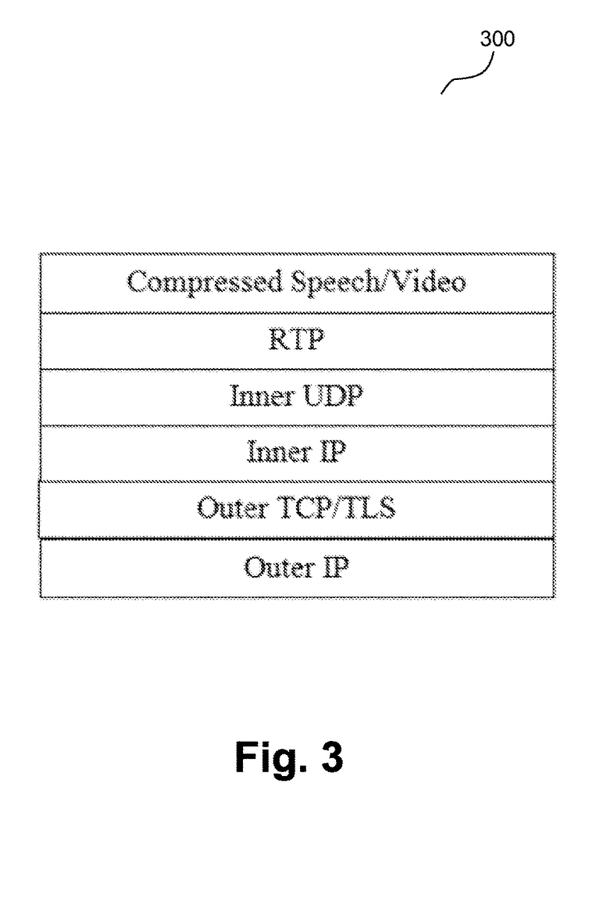
FIG. 3 illustrates example protocol layers in a tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

Encapsulated traffic in general may exhibit repeating patterns that requires high transmission rates and bandwidth requirements. Known solutions to reducing bandwidth requirements include using conventional application layer codecs that, due to their nature, fail to address this problem. Specifically, codecs are dependent on the media type under consideration (e.g., speech or video) and rely on computationally complex memory-less signal processing techniques (e.g., linear prediction and transforms) that ultimately ignore past patterns.

In contrast, as previously disclosed, embodiments, before transmitting encapsulated media, or frames, over a tunnel, determine if the same or redundant frame has previously been sent. If so, a sequence/reference number is substituted for the redundant frame. The encoding functionality can be implemented at either or both of client 106 or server 116, with the corresponding decoding functionality implemented at the other respective element. In one embodiment, the encoding/matching functionality is always performed by client 106, and depending on available resources (e.g., memory, processor power, etc.) is also performed by server 116. If only client 106 performs the matching, the encoding is half duplex. Otherwise it is full duplex.

In one embodiment, a ring buffer or circular buffer is included at client 106 and/or server 116 in order to implement the functionality. A ring buffer is a data structure that uses a single, fixed-size buffer as if it were connected end-to-end, and allows for the buffering of data streams. In other embodiments, other types of buffers can be used.

In one embodiment, either or both of client 106 or server 116 ring buffer up to "N" frames as they are encapsulated, where N is the buffer size. In one embodiment, each buffered frame, in addition, is stored alongside an MD5 hash or other type of cryptographic hash function for fast classification.

In one embodiment, client 106 requests the redundant traffic encoding functionality through a TSCF service request. Server 116, based on available memory resources, determines the buffer size N and informs client 106 through a TSCF service response. One embodiment provides TSCF SDKs that support an application programming interface ("API") so that application 104 can enable redundant traffic encoding for a specific inner socket. For example, application 104 may enable redundant traffic encoding at tunneling client 106 for an inner socket by executing a corresponding "tsc_setsockopt" API (i.e., a set socket API) with a corresponding new socket option when an inner socket is created. The TSCF SDK provides a Berkeley software distribution ("BSD")-like socket API that can be used to send and receive encapsulated media using the tsc_sendto and tsc_recvfrom functions, respectively.

In one embodiment, whenever a frame is to be encapsulated, both client 106 and server 116 calculate the MD5 hash of the frame and compare it against those of the buffered ones. If a match is found, both frames are also compared on a byte-by-byte basis to determine if they are identical. If so, rather than tunneling the frame, a reference to the stored frame is encapsulated instead.

Depending on latency constraints, both client 106 and server 116 process a multiple number of frames simultaneously in order to minimize the overhead due to the encapsulation of inner network and transport headers. Whenever redundant encoding is enabled on a given socket, client 106 notifies application 104, if configured, by means of the tsc_notification_enable API.

Figure 4:
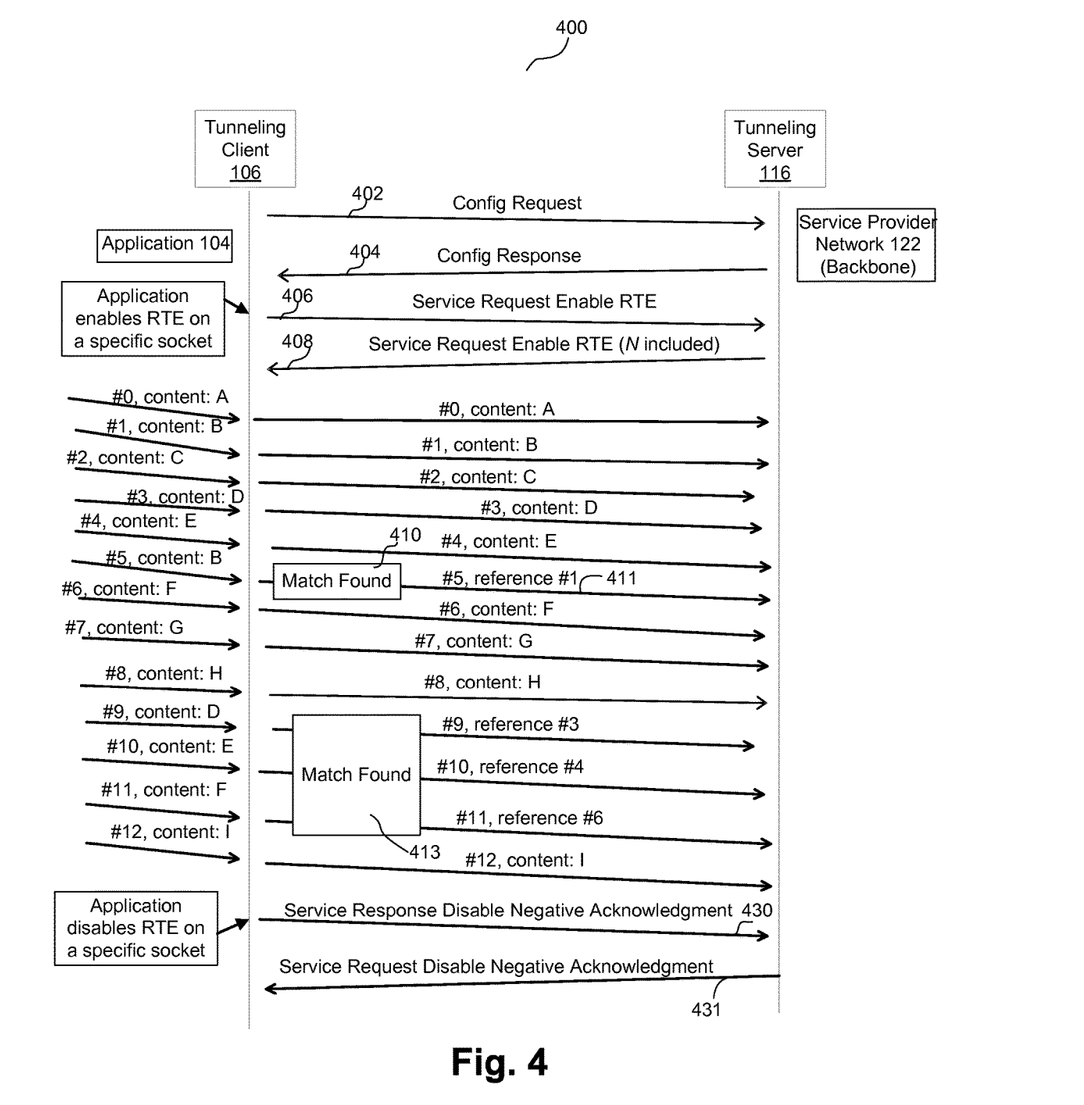
FIG. 4 is an example message sequence diagram including the sequence of messages exchanged between a tunneling client and a tunneling server for performing redundant encoding/decoding according to some embodiments.

FIG. 4 is an example message sequence diagram 400, including the sequence of messages exchanged between tunneling client 106 and tunneling server 116, for performing redundant encoding/decoding for tunneled encapsulated traffic according to some embodiments. FIG. 4 includes network elements such as tunneling client 106 in communication with application 104, and tunneling server 116 in communication with service provider network 122, as described herein with reference to FIG. 1.

At 402, tunneling client 106 sends a configuration request message to tunneling server 116 to establish TSCF tunnel 108. At 404, tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. In one embodiment, from the application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

At 406, application 104 enables RTE functionality for a specific inner socket in TSCF tunnel 108 by executing a "tsc_setsockopt" API on the corresponding inner socket. The execution of a "tsc_setsockopt" API causes client redundant encoding module 118 to send a TSCF service request message to tunneling server 116 to enable RTE functionality for the inner socket at tunneling server 116.

At 408, server redundant encoding module 120 at tunneling server 116 receives the service request message, determines if tunneling server 116 can comply with the request, and answers back to client redundant encoding module 118 with a TSCF service response message indicating the ring buffer size N to confirm that RTE functionality is enabled.

When application 104 sends frames using the tsc_sendto API, client 106 calculates the frame's MD5 hash 128-bit value and compares it against that of previously buffered frames. If a match is found, a more exhaustive byte-by-byte comparison is performed and if both frames are still identical, a reference, namely a frame number, is encapsulated instead of the frame. In addition, the frame is ring buffered alongside its MD5 hash 128-bit value.

Therefore, as shown in the example of FIG. 4, frames 0-4 are sent without a match detected. For frame 5, a match is found at 410, because the content "B" is the same content sent as frame 1. Therefore, at 411 a reference #1 (i.e., a reference to frame 1) is sent instead of frame 1. Similarly, at 413, a match is found from frames 9, 10 and 11. Therefore, references are sent instead of the frames.

When server 116 removes a received frame from tunnel 108, if it is a reference, it obtains the actual real frame out of its internal ring buffer using the reference as an index. Subsequently, both regular frames and those obtained out of references are stored in the ring buffer of server 116.

In order to disable RTE, application 104 executes a tsc_setsockopt on the socket of interest. Client 106 issues a service request at 430 to comply and server 116 responds back with the corresponding service response at 431. Both client 106 and server 116 release all memory resources associated to the ring buffers.

One embodiment supports redundant traffic encoding by providing: "Service_Type" TLV values to indicate redundant traffic encoding enablement and disablement; a Connection_Info TLV to indicate source and destination transport as well as network endpoints; and a Ring Buffer Size TLV to indicate the ring buffer size parameter N.

Table 1 below provides example TSCF TLVs for providing redundant traffic encoding functionality according to some embodiments.

TABLE 1

| TLV TYPE NAME | VALUE | SEMANTICS | SHORT/ LONG FORMAT | VALUE TYPE | LENGTH | NOTES |
| --- | --- | --- | --- | --- | --- | --- |
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable RTE = 50 Disable RTE = 51 |
| Ring_Buffer_Size | 41 | Ring Buffer Size | Short | Unsigned integer | 2 bytes | |

In one embodiment, redundant traffic encoding is requested by application 104 via tsc_socket APIs, more specifically by setting the appropriate socket option in the SDK using example pseudocode as follows:

```
int rte = 1
int result = tsc_setsockopt(rtp_socket, SOL_SOCKET, SO_TSC_RTE,
(char *)&rte, sizeof(int));
``` where the "rte" integer controls whether the feature is enabled (rte=1) or disabled (rte=0). If tsc_setsockopt returns −1, the option was not set correctly. If it returns 0, it was set correctly but support is not enabled until it is fully negotiated between client 106 and server 116. A notification "tsc_notification_rte" is added to notify client 106 when this negotiation is terminated. The following example pseudocode shows how the notification is enabled and what the notification callback function looks like:

```
tsc_notification_enable(handle, tsc_notification_rte, rte_notification, NULL);
void rte_notification(tsc_notification_data *notification)
{
   tsc_notification_rte_info_data *rte_data = (tsc_notification_rte_ info_data *)notification->data;
   if (rte_data && rte _data->available == tsc_bool_true) {
      if (rte _data->enabled == tsc_bool_true) {
         printf("rte enabled notification on socket %d\n", rte_data->socket);
      } else {
         printf("rte notification playing on socket %d\n", rte _data->socket);
      }
   } else {
      printf("rte notification not allowed on socket %d\n", rte _data->socket);
   }
}
```

The fourth NULL parameter in tsc_notification_enable is an opaque/private data pointer that can be recovered in the tsc_notification_data structure upon callback.

One embodiment that is implemented using an SBC, such as the Acme Packet 4500 from Oracle Corp., provides a configuration object "tscf-interface" that includes a parameter "rte-max-size", which corresponds to the ring buffer size N configured on server 116 and transmitted to client 106 during RTE negotiation. Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| rte-max-size | rteMaxSize | Integer | 0 (disabled) 1-65536 (enabled) | Optional |

The following functionality provides an example interface configuration for providing redundant encoding according to one embodiment:

```
        realm-id         access
            state            enabled
            max-tunnels         200
            local-address-pools   lp-1
            assigned-services    SIP
            rte-max-size         256
            tscf-port
                addre                 192.168.1.10
                port             2105
                transport-protocol  TCP
                tls-profile
                rekey-profile
            last-modified-by     admin@console
            last-modified-date   2015-01-01 10:00:00
```

The following is an example extensible markup language ("XML") functionality for providing redundant encoding according to one embodiment:

```
        <tscfInterface realmID='access'
            state='enabled'
            maxTunnels='200'
            assignedServices='SIP'
            rteMaxSize='256'
            options=''
            lastModifiedBy='admin@console'
            lastModifiedDate='2015-01-01 10:00:00'
            objectId='51'>
            <key>access</key>
```

-continued

```
            <localAddressPool name='lp-1'/>
            <tscfPort address='192.168.1.10'
                port='2105'
                transProtocol='TCP'
                tlsProfile=''
                rekeyProfile=''
        </tscfInterface>
```

In one embodiment, an encoder, whether located at client 106 or server 116, or both, keeps track of incoming frames, queuing them in a ring or circular buffer and simultaneously verifying whether the same frame content has been already stored. If a match is found, instead of encapsulating the whole frame, a reference or index within the buffer is encapsulated. A decoder, typically located at server 116, also keeps track of detunneled frames by buffering them into its own ring or circular buffer even when a reference is received. Because embodiments rely on synchronization between encoder and decoder, stream transport is needed for transmission of frames and references in one embodiment.

To improve computational performance, and improve the performance of the computer, the search process is done in two stages in one embodiment: (1) an MD5 hash is used to find all frames with a similar pattern weight; and (2) a byte-to-byte comparison is then performed. The encoder maps each hash to its corresponding frame.

The following pseudocode is an example of the redundant encoding functionality in accordance to one embodiment:

```
        rteEncode(frame):
            hash = MD5(frame)
            index = −1
            do
                index = queue.find(hash)
                if (index ≠ −1)
                    if (compare(frame, queue.get(index)))
                        break
                    endif
                endif
            while (index ≠ −1)
            if (index ≠ −1)
                tunnel.send(index)
            else
                tunnel.send(frame)
            endif
            queue.push(hash, frame)
```

The above pseudocode describes the rteEncode function that is used to encode a single frame, where "queue" represents the circular or ring buffer of size N, "tunnel" represents the tunnel client object, and "MD5" is the function that calculates the MD5 hash.

Figure 5:
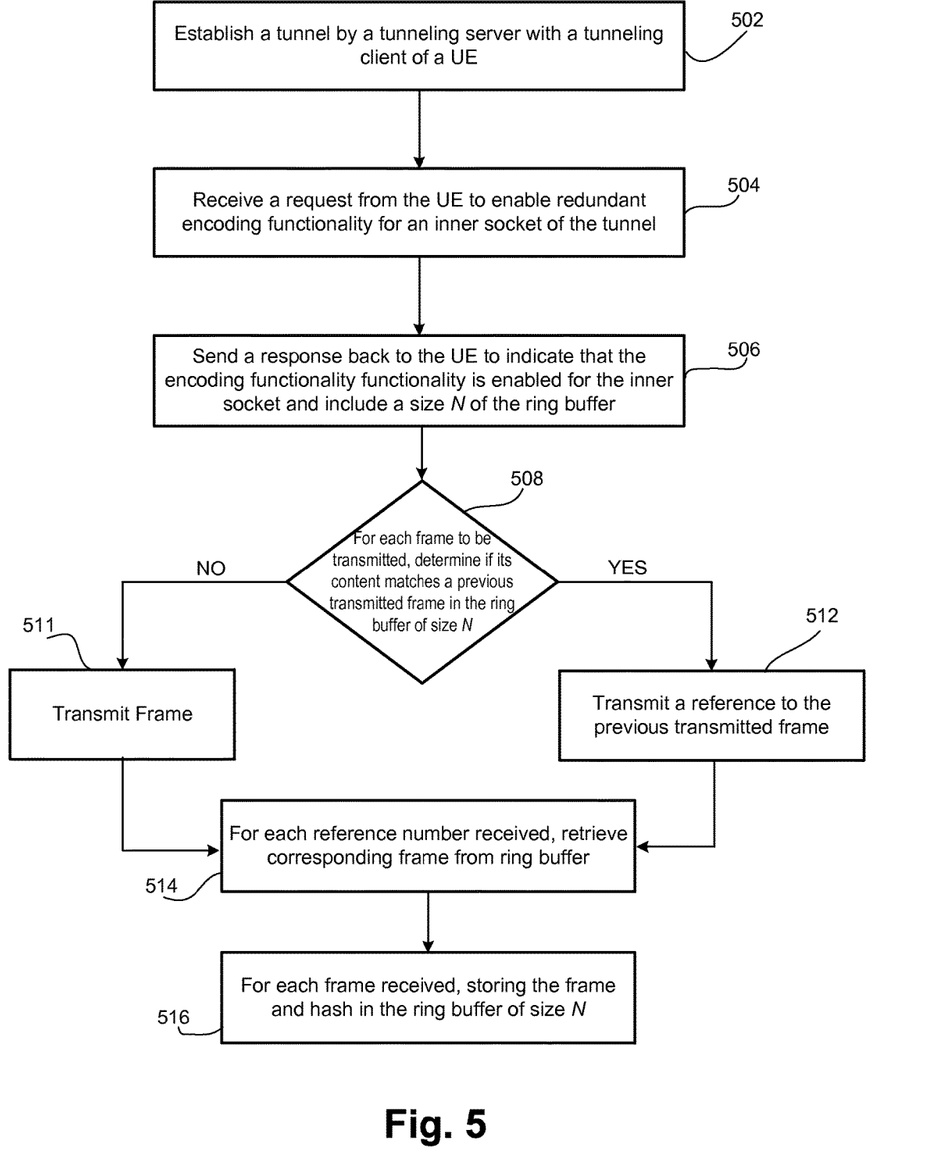
FIG. 5 is a flow diagram of a redundant encoding module of FIG. 2 and/or a tunneling client and tunneling server of FIG. 1 when performing redundant encoding/decoding in accordance with embodiments of the present invention.

FIG. 5 is a flow diagram of redundant encoding module 16 of FIG. 2 and/or tunneling client 106 and tunneling server 116 of FIG. 1 when performing redundant encoding/decoding in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, tunneling client 106 and tunneling server 116 establish TSCF tunnel 108. Tunnel 108 can include multiple inner sockets, such as a separate inner socket for speech data, video data, etc.

At 504, client redundant encoding module 118 at tunneling client 106 sends a TSCF service request to tunneling server 116 to enable redundant encoding functionality for a specific inner socket in TSCF tunnel 108. In one embodiment, client redundant encoding module 118 sends the request when application 104 executes an API to enable the redundant encoding functionality for the inner socket. A request can be made for any or all inner sockets of tunnel 108, but the functionality is implemented on a per socket basis.

At 506, server redundant encoding module 120 at tunneling server 116 sends a TSCF service response back to client redundant encoding module 118 to confirm that redundant encoding functionality is enabled for the inner socket. The service response includes a size N of a ring buffer at both client 106 and server 116.

At 508, for each frame transmitted on the inner socket, from client 106 (i.e., half duplex) and/or server 116 (i.e., full duplex), it is determined if the content matches previous sent frame content by comparing the content to the content stored in the ring buffer. In one embodiment, the searching of the same content in the ring buffer is a two stage process, where the first stage uses a hash, and the second stage performs a byte-to-byte comparison.

If no match is found at 508, the frame is transmitted at 511. If there is a match at 508, at 512 a reference to the matched frame is sent instead of the actual frame.

At 514, at the receiving end, at client 106 and/or server 116, when a reference number is received instead of the frame content, the frame corresponding to the reference number is retrieved from the ring buffer and is then sent to the destination.

At 516, for each frame received, the frame and its corresponding hash is stored in the ring buffer of size N As disclosed, embodiments, before transmitting encapsulated media, or frames, over a tunnel, determine if the same or redundant frame has previously been sent. If so, a reference number is substituted for the redundant frame. An embodiments minimizes the transmission rate because it takes advantage of the encapsulation framework to provide redundancy removal well inside of the tunneling architecture, and is transparent to the end user and independent of traffic type (e.g., speech, video, fax, data). Further, embodiments provide lossless compression (i.e., no information is lost) and have low computational complexity as compared to signal processing based encoding techniques.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform redundant encoding for real-time communications (RTC), the redundant encoding comprising:

establishing a tunnel by a tunneling server with a tunneling client of a user equipment (UE);

receiving a request from the UE to enable the redundant encoding for an inner socket of the tunnel;

sending a response back to the UE to indicate that the redundant encoding is enabled for the inner socket, the response comprising a buffer size;

for each first frame received on the inner socket, storing the first frame in a buffer comprising the buffer size;

receiving a first reference that corresponds to a second frame from the UE on the inner socket; and retrieving the second frame that corresponds to the first reference from the buffer;

wherein the first reference is transmitted over the tunnel instead of the second frame to reduce a bandwidth of traffic on the tunnel.

2. The computer readable medium of claim 1, further comprising, for each third frame that comprises content to be transmitted on the inner socket:

determining if the content matches stored content in the buffer;

when there is a match, transmitting a second reference to the matched content on the inner socket instead of the third frame.

3. The computer readable medium of claim 2, wherein the determining if the content matches comprises:

determining if a hash of the third frame matches a stored hash stored in the buffer;

if the hash matches, performing a byte-to-byte comparison of the third frame to a stored frame that corresponds to the stored hash.

4. The computer readable medium of claim 1, wherein the tunnel is configured according to a tunneled services control function (TSCF) standard.

5. The computer readable medium of claim 1, wherein the UE sends the request when an application at the UE executes an application programming interface (API) to request the redundant encoding for the inner socket of the tunnel.

6. The computer readable medium of claim 1, wherein the buffer is a ring buffer.

7. The computer readable medium of claim 2, wherein the second reference identifies the third frame.

8. A method for performing redundant encoding for real-time communications (RTC), the method comprising:

establishing a tunnel by a tunneling server with a tunneling client of a user equipment (UE);

receiving a request from the UE to enable the redundant encoding for an inner socket of the tunnel;

sending a response back to the UE to indicate that the redundant encoding is enabled for the inner socket, the response comprising a buffer size;

for each first frame received on the inner socket, storing the first frame in a buffer comprising the buffer size;

receiving a first reference that corresponds to a second frame from the UE on the inner socket; and retrieving the second frame that corresponds to the first reference from the buffer;

wherein the first reference is transmitted over the tunnel instead of the second frame to reduce a bandwidth of traffic on the tunnel.

9. The method of claim 8, further comprising, for each third frame that comprises content to be transmitted on the inner socket:
- determining if the content matches stored content in the buffer;
- when there is a match, transmitting a second reference to the matched content on the inner socket instead of the third frame.

10. The method of claim 9, wherein the determining if the content matches comprises:
- determining if a hash of the third frame matches a stored hash stored in the buffer;
- if the hash matches, performing a byte-to-byte comparison of the third frame to a stored frame that corresponds to the stored hash.

11. The method of claim 8, wherein the tunnel is configured according to a tunneled services control function (TSCF) standard.

12. The method of claim 8, wherein the UE sends the request when an application at the UE executes an application programming interface (API) to request the redundant encoding for the inner socket of the tunnel.

13. The method of claim 8, wherein the buffer is a ring buffer.

14. The method of claim 9, wherein the second reference identifies the third frame.

15. A tunneling server comprising:
- a processor; and
- a storage device coupled to the processor that stores a redundant encoding module, the redundant encoding module, when executed by the processor, implementing modules comprising:
- a tunneling module that establishes a tunnel by a tunneling server with a tunneling client of a user equipment (UE) and, in response to receiving a request from the UE to enable redundant encoding for an inner socket of the tunnel, sends a response back to the UE to indicate that the enable the redundant encoding is enabled for the inner socket, the response comprising a buffer size; and
- a redundant frame module that, for each first frame received on the inner socket, stores the first frame in a buffer comprising the buffer size, receives a first reference that corresponds to a second frame from the UE on the inner socket, and retrieves the second frame that corresponds to the first reference from the buffer;
- wherein the first reference is transmitted over the tunnel instead of the second frame to reduce a bandwidth of traffic on the tunnel.

16. The tunneling server of claim 15, the redundant frame module further, for each third frame that comprises content to be transmitted on the inner socket, determining if the content matches stored content in the buffer and, when there is a match, transmitting a second reference to the matched content on the inner socket instead of the third frame.

17. The tunneling server of claim 16, wherein the determining if the content matches comprises determining if a hash of the third frame matches a stored hash stored in the buffer and, if the hash matches, performing a byte-to-byte comparison of the third frame to a stored frame that corresponds to the stored hash.

18. The tunneling server of claim 15, wherein the tunnel is configured according to a tunneled services control function (TSCF) standard.

19. The tunneling server of claim 15, wherein the UE sends the request when an application at the UE executes an application programming interface (API) to request the redundant encoding for the inner socket of the tunnel.

20. The tunneling server of claim 15, wherein the buffer is a ring buffer.

* * * * *

UNITED STATES PATENT AND TRADEMARK OFFICE
CERTIFICATE OF CORRECTION

| | |
|---|---|
| PATENT NO. | : 9,762,412 B2 |
| APPLICATION NO. | : 14/831182 |
| DATED | : September 12, 2017 |
| INVENTOR(S) | : Herrero |

It is certified that error appears in the above-identified patent and that said Letters Patent is hereby corrected as shown below:

In the Drawings

On sheet 5 of 5, in Fig. 5, under Reference Numeral 506, Line 2, delete "functionality functionality" and insert -- functionality --, therefor.

In the Specification

In Column 9, Line 47, delete "addre" and insert -- address --, therefor.

In Column 11, Line 49, after "N" insert -- . --.

Signed and Sealed this
Twenty-second Day of May, 2018

Andrei Iancu
*Director of the United States Patent and Trademark Office*